United States Patent [19]
Leblans et al.

[11] Patent Number: 5,569,926
[45] Date of Patent: Oct. 29, 1996

[54] RADIATION IMAGE RECORDING AND REPRODUCING METHOD

[75] Inventors: Paul Leblans; Lodewijk Neyens, both of Kontich; Luc Struye, Mortsel; Peter Willems, Stekene, all of Belgium

[73] Assignee: Agfa-Gevaert, N.V., Mortsel, Belgium

[21] Appl. No.: 532,497

[22] Filed: Sep. 22, 1995

[30] Foreign Application Priority Data

Sep. 27, 1994 [EP] European Pat. Off. .............. 94202795

[51] Int. Cl.$^6$ ..................................................... C09K 11/61
[52] U.S. Cl. ................................. 250/484.4; 252/301.4 H
[58] Field of Search ............................... 250/484.4, 581; 252/301.4 H, 301.4 F

[56] References Cited

U.S. PATENT DOCUMENTS 5,464,568  11/1995  Bringley et al. .

FOREIGN PATENT DOCUMENTS 60-190489  9/1985  Japan ............... 252/301.4 H

*Primary Examiner*—Davis L. Willis
*Assistant Examiner*—Richard Hanig
*Attorney, Agent, or Firm*—Breiner & Breiner

[57] ABSTRACT

A radiation image recording and reproducing method is provided, comprising the steps of:

i. causing a radiation image storage panel containing a photostimulable phosphor to absorb radiation having passed through an object or having been radiated from an object, ii. exposing said image storage panel to stimulating rays to release the radiation energy stored therein as light emission, the stimulating rays being electromagnetic waves having a wavelength within the range of 700–900 nm iii. detecting the emitted light, characterised in that said photostimulable phosphor corresponds to the general formula:

$$Ba_{1-x-y''-z-r}Sr_xPb_{y''}Cs_{2r}Eu_zF_{2-a-b}Br_aI_b,$$

wherein
$0 \leq x \leq 0.30$, $10^{-4} < y'' < 10^{-3}$, $10^{-7} < z < 0.15$, $0 \leq r < 0.05$, $0.75 \leq a+b \leq 1.00$, $0.05 < b < 0.20$.

20 Claims, No Drawings

RADIATION IMAGE RECORDING AND REPRODUCING METHOD

DESCRIPTION

1. Field of the Invention

This invention relates to a photostimulable alkaline earth fluorobromide phosphor especially suited for being photostimulated by infrared radiation.

2. Background of the Invention

In a method of recording and reproducing an X-ray pattern disclosed e.g. in U.S. Pat. No. 3,859,527 a special type of phosphor is used, known as a photostimulable phosphor, which being incorporated in a panel is exposed to incident pattern-wise modulated X-rays and as a result thereof temporarily stores therein energy contained in the X-ray radiation pattern. At some interval after the exposure, a beam of light scans the panel to stimulate the release of stored energy as light that is detected and converted to sequential electrical signals which are processable to produce a visible image. For this purpose, the phosphor should store as much as possible of the incident X-ray energy and emit as little as possible of energy until stimulated by the scanning beam.

As described in U.S. Pat. No. 4,239,968 europium-doped barium fluorohalides are particularly useful for application as stimulable phosphors for their high sensitivity to stimulating light of a He-Ne laser beam (633 nm), ruby laser beam (694 nm), the optimum of stimulation being in the range of 500 to 700 mn. The light emitted on stimulation, called stimulated light is situated in the wavelength range of 350 to 450 nm with its main peak at 390 nm (ref. the periodical Radiology, September 1983, p. 834).

As described in said periodical the imaging plate containing the stimulable phosphor can be used repeatedly to store X-ray images simply by flooding it with light to erase the residual energy it contains. This erasure of residual energy has to proceed both very rapidly (the imaging plate has to be rapidly available for repeated use) and very thoroughly (the imaging plate can not carry so called "ghost images" of the previous exposure when used for a new exposure. These two prerequisites of imaging plates are not easily met.

It has been found that, for many storage phosphors, a higher efficiency of erasure can be achieved when using stimulating electromagnetic rays with wavelengths within the range of 700 to 900 nm than when using as stimulating rays electromagnetic rays within the visible range, as indicated in e.g. EP 136 588.

For this reason the search for photostimulable phosphors being stimulable using as stimulating rays electromagnetic rays with a wavelength within the range of 700 to 900 nm still continues.

Another advantage of using photostimulable phosphors stimulable with electromagnetic rays within the range of 700 to 900 nm is the possibility of use of small, high power solid state lasers in the stimulation step. The ratio between availability, cost and size of high power solid state lasers is nowadays the highest for solid state lasers emitting light with wavelengths in the range of 700 to 900 nm. The use of such lasers makes it possible to reduce the size of the apparatus designed to read the imaging plates.

Europium activated bariumfluorohalide stimulable phosphors, where the halide is bromine, show a very poor stimulability in the wavelength range beyond 750 nm, as can be seen in FIG. 2 of EP-A 136 588.

It has been known for a long time that F-centers based on halide vacancies with larger ionic radii exhibit their absorption bands at longer wavelengths in accordance with the Mollwo relation familiar F-centers in alkali halides. Accordingly, it can be expected that the substitution of Br by I (I having a larger ionic radius than Br), allows the creation of larger anion vacancies, thereby shifting the absorption bands of the corresponding F-centers to longer wavelengths, and enhancing the stimulability of the storage phosphor with I.R.-radiation.

We have indeed found that, phosphors with composition:

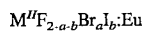

wherein $0<b\leq 0.20$ and $0.95<a+b<1.20$ have improved stimulability, in the wavelength range higher than 600 nm, and especially in the range higher than 700 nm.

In EP-A 614 961 a method for preparing phosphor particles has been disclosed. Among the phosphors that could be prepared by the method claimed was also a modified Bariumfluorohalide phosphor within the scope of the following empirical formula:

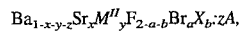

wherein:
M″ is at least one member selected from the group consisting of Mg and Ca;
X is at least one member selected from the group consisting of Cl and I;
x is in the range $0\leq x\leq 0.55$;
y is in the range $0\leq y<0.05$;
a+b is smaller than 1,
a is in the range $0.70\leq a\leq 0.96$,
b is in the range $0\leq b<0.15$;
z is in the range $10^{-6}\leq z\leq 10^{-2}$,
A is $Eu^{2+}$ or $Eu^{2+}$ together with one or more of the co-dopants selected from the group consisting of $Eu^{3+}$, Y, Tb, Ce, Tm, Dy, Pr, Ho, Nd, Yb, Er, La, Gd and Lu, It has also been disclosed in that document that such a barium(strontium) fluorohalide phosphors can contain Cs ions in an amount of $10^{-2}$ to 1 atom %. These bariumfluorohalide phosphors are stimulable with infra-red light. Bariumfluorohalide phosphors with general formula's closely related to the general formula, recited in EP-A 614 961, have been disclosed in EP-A 345 903, EP-A 345 904 and EP-A 345 905.

However, the stimulability of the abovementioned class of phosphors with electromagnetic radiation with wavelengths in the 700–900 nm range is still insufficient, in spite of the availability of high laser power, thereby yielding systems with a too low sensitivity. Accordingly, beam-combining laser beam sources have been developed in order to combine the power of a number I.R.-lasers as described in U.S. Pat. No. 5,216,544 and in European patent application 93203583.5 filed on Dec. 20, 1993. The beam-combining laser beam sources have the disadvantage of being very temperature sensitive.

There is, therefore, still need for stimulable phosphors with higher stimulability with electromagnetic radiation with wavelengths in the range from 700 to 900 nm to enhance system sensitivity.

Objects and Summary of the Invention

It is an object of the present invention to provide a radiation image recording and reproducing system for digital radiography using storage phosphor plates, which is cheap and compact and which allows efficient erasure of the read-out image, providing, therefore, high image quality upon repeated use of the image plate.

It is another object of the invention to provide a photostimulable phosphor having a very high stimulability with electromagnetic radiation with wavelengths in the range from 700 to 900 ran to enhance system sensitivity.

It is a further object of the invention to provide a stimulable phosphor having a very high stimulability with electromagnetic radiation with wavelentghs in the range from 700 to 900 nm so that a single, small, high power solid state laser can be used in the stimulation step of a radiation image recording and reproducing system for digital radiography using storage phosphor plates.

Other objects and advantages of the invention will becomes clear from the detailed description hereinafter.

The objects of the invention are realized by providing a radiation image recording and reproducing method comprising the steps of:

i. causing a radiation image storage panel containing a photostimulable phosphor to absorb radiation having passed through an object or having been radiated from an object, ii. exposing said image storage panel to stimulating rays to release the radiation energy stored therein as light emission, the stimulating rays being electromagnetic waves having a wavelength within the range of 700–900 nm iii. detecting the emitted light, characterised in that said photostimulable phosphor corresponds to the general formula:

$$Ba_{1-x-y''-z-r}Sr_xPb_{y''}Cs_{2r}Eu_zF_{2-a-b}Br_aI_b,$$

wherein $0 \leq x \leq 0.30$, $10^{-4} < y'' < 10^{-3}$, $10^{-7} < z < 0.15$, $0 \leq r < 005$, $0.75 \leq a+b \leq 1.00$, $0.05 < b < 0.20$.

In a preferred embodiment the photostimulable phosphor corresponds to the general formula:

$$Ba_{1-x-y-z-r}Sr_xCa_{y'}Pb_{y''}Cs_{2r}Eu_zF_{2-a-b}Br_aI_b,$$

wherein $0 \leq x \leq 0.30$, $0.01 < y < 0.15$, $10^{-4} < y'' < 10^{-3}$, $y = y' + y'' 10^{-7} < z < 0.15$, $0 \leq r < 0.05$, $0.75 \leq a+b \leq 1.00$, $0.05 < b < 0.20$.

DETAILED DESCRIPTION OF THE INVENTION

In a method for recording and reproducing a radiation image using imaging plates containing a photostimulable phosphor, the imaging plate can be used repeatedly to store X-ray images simply by flooding it with light to erase the residual energy it contains. This erasure of residual energy has to proceed both very rapidly (the imaging plate has to be rapidly available for repeated use) and very thoroughly (the imaging plate can not carry so called "ghost images" of the previous exposure when used for a new exposure. These two prerequisites of imaging plates are not easily met.

It has been found that, for many storage phosphors, a higher efficiency of erasure can be achieved when using as stimulating rays electromagnetic rays with wavelengths within the range of 700 to 900 nm than when using as stimulating rays electromagnetic rays within the visible range, as indicated in e.g. EP 136 588.

Europium activated bariumfluorohalide stimulable phosphors, where the halide is bromine, show a very poor stimulability in the wavelength range beyond 750 nm, as can be seen in FIG. 2 of EP-A 136 588.

It has been known for a long time that F-centers based on halide vacancies with larger ionic radii exhibit their absorption bands at longer wavelengths in accordance with the Mollwo relation familiar from F-centers in alkali halides. Accordingly, it can be expected that the substitution of Br by I (I having a larger ionic radius than Br), allows the creation of larger anion vacancies, thereby shifting the absorption band of the corresponding F-centers to longer wavelengths, and enhancing the stimulability of the storage phosphor with I.R.-radiation.

It has now been found that not only the substitution of part of the bromine ions present in an alkaline earth fluorobromide stimulable phosphor by iodine ions enhances the infrared (IR) stimulability of such a phosphor, but that even better IR stimulability could be achieved by replacing a part of the barium ions by a smaller divalent metal ion.

This replacement of barium ions by smaller divalent metal ions was found to work in phosphors having the formula:

$$Ba_{1-x}Sr_xF_{2-a}Br_a:Eu \qquad (I)$$

and in phosphors of the class:

$$Ba_{1-x}Sr_xF_{2-a-b}Br_aI_b:Eu \qquad (II)$$

and in phosphors of the class:

$$Ba_{1-x-r}Sr_xCs_{2r}F_{2-a-b}Br_aI_b:Eu \qquad (III).$$

In the three classes of phosphor, cited above, the values of x, a, b and r are within the following ranges: $0 \leq x \leq 0.30$, $0 \leq r < 0.05$, $0.75 \leq a+b \leq 1.00$, $0.05 < b < 0.20$. In these phosphors part of the barium ions are replaced by the smaller strontium ion. It was also found that the replacement of part of the barium ions by lead ions ions enhance the infrared stimulability of the photostimulable phosphor. The incorporation of lead ions in amounts not higher than $10^{-4}$ mole % in bariumfluorohaide phosphors have been disclosed in Japaes Laid Open Application JN 60/192 784, wherein a phosphor with general formula:

$$(Ba_{1-a}M_a)FX:xEu,yPb,$$

wherein M is at least one member selected from the group consisting of Be, Mg, Ca, Sr, Zn, Cd and $0 \leq a \leq 0.2$ and $0 < y \leq 0.0001$. Such a phosphor is claimed to enhance the stimulability of the phsophor at 632 nm. It was now surprisingly found that high stimulability in the infrared region could be obtained when using a stimulable phosphor, incorporating divalent lead ions ($Pb^{2+}$) corresponding to the general formula:

$$Ba_{1-x-y''z-r}Sr_xPb_{y''}Cs_{2r}Eu_zF_{2-a-b}Br_aI_b,$$

wherein $0 \leq x \leq 0.30$, $10^{-4} < y'' < 10^{-3}$, $10^{-7} < z < 0.15$, $0 \leq r \leq 0.05$, $0.75 \leq a+b \leq 1.00$, $0.05 < b < 0.20$.

During the investigation it was surprisingly found that further replacement of barium ions (already partially replaced by strontium ions) by lead ions provided stimulable phosphors that were still better stimulable (gave a higher speed system) with IR stimulation with electromagnetic radiation with wavelengths between 700 and 900 nm.

It was found that stimulable phosphors with better IR stimulability (infrared stimulability) than any presently available stimulable phosphor were obtained with a composition corresponding to the following general formula:

$$Ba_{1-x-y''-z-r}Sr_xPb_{y''}Cs_{2r}Eu_zF_{2-a-b}Br_aI_b,$$

wherein $0<x\leq 0.30$, $10^{-4}<y''<10^{-3}$, $10^{-7}<z<0.15$, $0\leq r<0.05$, $0.75<a+b\leq 1.00$, $0.05<b<0.20$.

It was also found that the infra-red stimulability, i.e. the speed of the storage phosphor when stimulated with infrared radiation could greatly be enhanced when together with divalent lead ions, calcium ions where present. Very good infra-red stimulability was obtained with a phosphor corresponding to general formula:

$$Ba_{1-x-y-z-r}Sr_xCa_{y'}Pb_{y''}Cs_{2r}Eu_zF_{2-a-b}Br_aI_b,$$

wherein $0\leq x\leq 0.30$, $0.01<y<0.15$, $10^{-4}<y''<10^{-3}$ $y=y'=y''$
$10^{-7}<z<0.15$, $0\leq r<0.05$, $0.75\leq a+b\leq 1.00$,
$0.05<b<0.20$.

In a preferred embodiment, in the phosphor according to the present invention barium ions are partially replaced by strontium, lead and calcium ions according to general formula:

$$Ba_{1-x-y-z-r}Sr_xCa_yPb_{y''}Cs_{2r}Eu_zF_{2-a-b}Br_aI_b,$$

wherein $0<x\leq 0.30$, $0.01<y<0.15$, $10^{-4}<y''<10^{-3}$ $y=y'+y''$ $10^{-7}<z<0.15$, $0\leq r<0.05$, $0.75\leq a+b\leq 1.00$, $0.05<b<0.20$.

Phosphors according to the present invention can be produced according to any way known in the art, starting from phosphor precursors that are to be incorporated in the phosphor. These phosphor precursors are mixed in the appropriate stoechiometric proportions and are then heated for a given time. After cooling, the sintered block of phosphor is milled into fine phosphor particles. The milling operation continues until phosphor particles with the appropriate average particle size and size distribution is obtained. Optionally the milled phosphor powder can be classified in separate fraction with a specific particle size distribution. During the preparation of the phosphor any known flux materials can be added to the reaction mixture. Flux materials useful for use in the preparation of the phosphors according to the invention are, e.g., halides, metasilicates of alkali metals or alkaline earth metals. Most preferred are fluxes comprising halides of the alkali metals or alkaline earth metals that are already present in the raw mix. A very useful and preferred method for the preparation of stimulable phosphors according to the present invention can be found in Research Disclosure Volume 358, February 1994 p 93 item 35841, that is incorporated herein by reference.

An other useful method for preparation of stimulable phosphors according to this invention can be found in U.S. Pat. No. 5,154,360.

In essence any known method for preparing X-ray phosphors comprises the steps of :

(i) mixing phosphor precursor materials to form a "raw mix"

(ii) grinding said "raw mix" to increase the surface area, (iii) firing said grinded "raw mix" at a high temperature in one or multiple stage to allow the precursors to react and form the phosphor which is present as a sintered lump (iv) desagglomerating said sintered lump of phosphor in a mortar-mill (v) grinding said desagglomerated lump of phosphor to form fine phosphor particles and classifying said fine phosphor particles in an air classifier.

The phosphor particles for use in the method according to the present invention, are preferably classified. This classification, ensures that the size distribution of the phosphor particles comprises at most 20% by weight, preferably at most 10% by weight, of particles with a diameter lower than 1 μm. The absence of small phosphor particles (phosphor particles with diameter≦1 μm) had a beneficial effect on the image quality.

For use in the method according to the present invention the phosphor can present in dispersed form in a binder layer that may be supported or self-supporting and forms a screen or panel.

The binder layer incorporates said phosphor in dispersed form preferably in (a) film forming organic polymer(s), e.g. a cellulose acetate butyrate, polyalkyl (meth) acrylates, e.g. polymethyl methacrylate, a polyvinyl-n-butyral e.g. as described in the U.S. Pat. No. 3,043,710, a copoly(vinyl acetate/vinyl chloride) and a copoly(acrylonitrile/butadiene/styrene) or a copoly(vinyl chloride/vinyl acetate/vinyl alcohol) or mixture thereof.

When a binder is used, it is most preferred to use a minimum amount of binder. The weight ratio of phosphor to binder preferably from 80:20 to 99:1. The ratio by volume of phosphor to binding medium is preferably more than 85/15.

Preferably the binding medium substantially consists of one or more hydrogenated styrene-diene block copolymers, having a saturated rubber block, as rubbery and/or elastomeric polymers as disclosed in WO 94/00531. Particularly suitable thermoplastic rubbers, used as block-copolymeric binders in phosphor screens in accordance with this invention are the KRATON-G rubbers, KRATON being a trade mark name from SHELL.

The coverage of the phosphor is preferably in the range from about 5 and 250mg/cm², most preferably between 20 and 175 mg/cm².

The stimulable phosphor used according to the present invention is preferably protected against the influence of moisture by adhering thereto chemically or physically a hydrophobic or hydrophobizing substance. Suitable substances for said purpose are described e.g. in U.S. Pat. No. 4,138,361.

According to a preferred embodiment the phosphor layer is used as a supported layer on a support sheet. Suitable support materials are made of a film forming organic resin, e.g. polyethylene terephthalate, but paper supports and cardboard supports optionally coated with a resin layer such as an alpha-olefinic resin layer are also particularly useful. Further are mentioned glass supports and metal supports. The thickness of the phosphor layer is preferably in the range of 0.05 mm to 0.5 mm.

When the phosphor according to the present invention is used in combination with a binder to prepare a screen or a panel, the phosphor particles are intimately dispersed in a solution of the binder and then coated on the support and dried. The coating of the present phosphor binder layer may proceed according to any usual technique, e.g. by spraying, dip-coating or doctor blade coating. After coating, the solvent(s) of the coating mixture is (are) removed by evaporation, e.g. by drying in a hot (60° C.) air current.

An ultrasonic treatment can be applied to improve the packing density and to perform the de-aeration of the phosphor-binder combination. Before the optional application of a protective coating the phosphor-binder layer may be calendered to improve the packing density (i.e. the number of grams of phosphor per cm³ of dry coating).

Optionally a light-reflecting layer is provided between the phosphor-containing layer and its support to enhance the output of light emitted by photostimulation. Such a light-reflecting layer may contain white pigment particles dispersed in a binder, e.g. titanium dioxide particles, or it may be made of a vapour-deposited metal layer, e.g. an aluminium layer, or it may be a coloured pigment layer absorbing stimulating radiation but reflecting the emitted light as described e.g. in U.S. Pat. No. 4,380,702.

In order to improve resolution it is possible to provide underneath the phosphor layer a layer absorbing the emitted light e.g. a layer containing carbon black or to use a coloured support e.g. a grey or black film support.

For stimulating the stimulable phosphor, any laser (e.g. diode laser, dye lasers etc) or light emitting diode emitting light within the wavelength range between 700 and 900 nm can be used. A suitable dye laser for use according to the present invention is a Ti-sapphire Styryl 9 laser that, depending on the pump source, emits light in the range from 775 to 900 nm (see e.g. in Jeff Hecht, The Laser Guidebook, second edition, Ed. TAB Books, Blue Ridge Summit, Pa. table 17.2 page 278). Preference is given to solid state diode laser source emitting in said wavelength range. In the above cited Laser Guidebook suitable diode lasers can be found in table 19.1 page 336, also in Laser and Optronic Dec. 25 1991 p 116 ss. an list of commercially available solid state diode lasers, useful in the method according to the present invention can be found. Preferably GaAlAs laser sources are used, and most preferably a GaAlAs diode laser emitting light with a wavelength of 835 nm.

The invention is illustrated by the examples and comparative examples given below, without however restricting the invention thereto.

EXAMPLES

1. Preparation of the Stimulable Phosphors

All stimulable phosphor samples have been prepared in the following way:

The phosphor precursors forming a raw mix, in proportions chosen as to yield a particular phosphor, were collected in a PE container, and the mix was homogenized for 15' on a jarr rolling mill. Next, the powder mix was transferred to a rotating blade mixer (Henschel-Germany) and milled for 5' at 2,000 rpm under Ar atmosphere. Three crucibles containing 130 g of the mix each, were placed in a quartz tube. The quartz tube was sealed with a flange with a water lock at the gas outlet side. The sealed quartz tube was placed in an oven at 850° C., and the temperature was kept constant at this temperature during the three hour firing. During the firing the tube was flushed with Ar at a rate of 1.5 /min. After the firing, the tube was taken out of the furnace and allowed to cool. After the cooling, the flange was removed and the three crucibles were taken out of the tube. The powder was milled and homogenized. A second firing was performed at 750° C., for 6 hours, under a 1.5 l/min 99.8% $N_2$/0.2% $H_2$ gas flow rate. Finally the powder was deagglomerated with a pestle and mortar.

The proportions of the phosphor precursors are given under the headings of the specific examples.

2. Measurements

2.1. Measurement A: Phosphor Composition

Since he cations do not evaporate during the firing, the Ba, Sr, Ca, Cs, Pb and Eu contents of the phosphors were not measured, and it was assumed that the cation ratios were equal to those in the raw mix. The halides being in excess over the non-evaporating cations, when using ammonium halides as reactants, evaporate partly during the firing. The F- and Br-content of the phosphors was determined via ion-chromatography.

Measuring equipment and conditions:
  ion chromatograph: gic analyser
  detector: conductivity detector
  guard columna: AG 3
  separator column: AS 3
  injection volume: 50μl
  detector sensitivity: 100μs/1000 mV full scale
  eluence: 2.8 mM $NaHCO_3$: 2.2 mM $Na_2CO_3$
  eluence flow rate: 2.0 ml/min
  regenerant: 0.025 N $H_2SO_4$
  regenerant flow rate: 3.0 mi/min
  reference time F: 1.65 min Determination of $F^-$ The concentration of the fluoride ions ($F^-$) was determined from the height of the F-peak.

To determine the accuracy of the measuring procedure five 1 ppm NaF standards were prepared:

0.5525 g NaF p.a. (pro analysis quality) was weighed and transferred into a 250 ml volumetric flask. The NaF was dissolved in doubly distilled water and water was added to get a total volume of 250 ml. The solution was first diluted 10-fold with doubly distilled water and then further diluted 100-fold. The five 1 ppm NaF standards were injected and the peak height was measured. The average peak height was 385,068 in arbitrary values and the standard deviation was 914.299. This gave a coefficient of variability (standard deviation divided by the average value) of 0.00237.

To measure the F-concentration in the phosphor samples, 50 mg of each sample was transferred into a test tube and 1 ml of analytically pure HCl (1 N) was added followed by the addition of about 10 ml of doubly-distilled water. The tube was then sealed and heated for 5 to 10 min in a boiling water bath. The tube was then cooled in ice and 1 ml of NaOH (1N) was injected. The solution was then poured into a 50 ml volumetric flask and the solution made up to 50 ml with doubly distilled water. Finally'the solution was diluted 50-fold with eluence and injected into the ion-chromatograph.

The correctness of the results obtained with the measuring procedure was tested by applying it three times to a pure $BaF_2$ standard, that theoretically contains 21.7% F. The dilution factor was 100 instead of 50. The average percentage F measured on the pure $BaF_2$ standard was 21.73 with a standard deviation of 0.115. This gave a coefficient of variability (standard deviation divided by the average value) of 0.0053.

The reproducibility of the F-concentration measurement, in a phosphor, was determined by performing the measurement in 5-fold for a standard phosphor. The average percentage F measured on the standard phosphor was 8.14 with a standard deviation of 0.288. This gave a coefficient of variability (standard deviation divided by the average value) of 0.0354.

Determination of $Br^-$

The concentration of the fluoride ions ($Br^-$) was determined from the height of the Br-peak.

To determine the accuracy of the measuring procedure for determining the bromide ion content five 5 ppm NaBr standards were prepared as follows :

0.3219 g NaBr p.a. (pro analysis quality) was weighed and transferred into a 250 ml volumetric flask. The NaBr was dissolved in doubly distilled water and diluted up to a total volume of 250 ml. The 1000 ppm solutions were diluted 200-fold with double distilled water and then injected into the ion-chromatograph. The peak height was measured. The average peak height was 200,709 in arbitrary values and the standard deviation was 669.106. This gave a coefficient of variability (standard deviation divided by the average value) of 0.00333.

The reproducibility of the results obtained with the described procedure was determined by performing the measurement 5-fold for a standard phosphor. The average percentage Br measured on the standard phosphor was 32.076 with a standard deviation of 0.180. This gave a coefficient of variability (standard deviation divided by the average value) of 0.0056. The I-content was determined via XRF (X-ray diffraction).

2.2. Measurement B: the Total Photostimulable Energy Stored Upon Exposure to Given X-Ray Dose Prior to X-ray excitation any residual energy still present in the phosphor screen is removed by irradiation with a halogen lamp of 500 W. The phosphor screen is then excited with an X-ray source operating at 85 kVp and 20 mA. For that purpose the Nanophos X-ray source of Siemens AG-W Germany was used. The low energy X-rays are filtered out with a 21 mm thick aluminum plate to harden the X-ray spectrum. After X-ray excitation the phosphor screen is transferred in the dark to the measurement setup. In this setup laser light is used to photostimulate the X-ray irradiated phosphor screen. The laser used in this measurement is the CW Single Mode GaAlAs laser diode type SDL-5402-H1 manufactured by Spectra Diode Labs, Zevenaar, The Netherlands. With this laser an optical power of 150 mW is available on 837 nm.

The laser-optics comprise an electronic shutter, a beam-expander and a filter. A photomultiplier (Hamamatsu R 1398) collects the light emitted by the photostimulation and gives a corresponding electrical current. The measurement Procedure is controlled by a Hewlett Packard Basic Controller 382 connected to a HP 6944 multiprogrammer. After amplification with a current to voltage convertor a TEKTRONIX TDS420 digital oscilloscope visualizes the photocurrent obtained. When the electronic shutter is opened the laser beam begins to stimulate the phosphor screen and the digital oscilloscope is triggered. Using a diagfraghme placed in contact with the screen the light emitted by only 7 mm² is collected. Only half the laser power (75 mW) reaches the screen surface. In this way the intensity of the stimulating beam is more uniform.

The signal amplitude from the photomultiplier is linear with the intensity of the photostimulating light and with the stored photostimulable energy. The signal decreases with a power law. When the signal curve is entered the oscilloscope is triggered a second time to measure the offset which is defined as the component of error that is constant and independent of inputs. After subtracting this offset the point at wich the signal reaches 1/e of the maximum value is calculated. The integral below the curve is then calculated from the start to this 1/e point. The function is described mathematically by $f(t)=A.e^{-t/\tau}$:

wherein A is the amplitude, $\tau$ is the time constant, t is stimulation time, and e is the base number of natural logarithms.

The 1/e point is reached when $t=\tau$ at which 63% of the stored energy has been released. To obtain said result, the computer multiplies the integral with the sensitivity of the system. The sensitivity of the photomultiplier and amplifier have therefore to be measured as a function of anode-cathode voltage of the photomultiplier and the convolution of the emission spectrum of the phosphor and the transmission spectrum of the separating filter has to be calculated. Because the emission light is scattered in all directions only a fraction of the emitted light is detected by the photomultiplier. The position of the panel and photomultiplier are such that 10% of the total emission is detected by the photomultiplier. After all these corrections have been made a conversion efficiency value (C.E.) is obtained in $pJ/mm^{3/}$ $_{mR}$. This value varies with screen thickness and therefore for measurements to be comparable they have to be carried out at constant phosphor coverage.

The stimulation energy (S.E.) is defined as the energy necessary to stimulate 63% of the stored energy and is expressed in $\mu J/mm^{2}$.

From the values C.E. and S.E. a figure of merit (F.O.M.) that is a value describing the sensitivity of the phosphor for practical use. F.O.M.=1000×C.E/S.E..

2.3. Measurement C: The Stimulation Spectrum

The light of a tungsten (quartz-iodine) lamp is fed into a monochromator (SPEX 270 M) and then mechanically chopped with a rotating wheel with a single hole. The lamp provides a continuous spectrum extending from the near UV through the visible spectrum into the infrared. The grating from Jobin Yvon is a 1200 line/mm grating covering the visible range from 350 to 1100 nm in the first order and is blazed at 500 nm. The wavelength of the stimulating light can be set via a stepper motor wich is build in the monochromator and that can be controlled over the RS232 bus by the computer. The second harmonic of the monochromator is eliminated by placing the combination of a 5 mm Schott GG435 filter with 3 gelatine filters L435 and a gelatine filter L453 in front of the phosphor screen. By chopping the stimulating light (duty cycle 1/200) only a small fraction of the absorbed energy in the phosphor is released. Only the AC signal is measured to eliminate the offset caused due to e.g. the dark current of the photomultiplier. A good signal to noise ratio is obtained by averaging several pulses. Upon completing the measurement the computer corrects the curve for the intensity wavelength dependence of the tungsten lamp. The measurement can be repeated so that the evolution of the stimulation spectrum can be followed over a period of up to 15 hours.

INVENTION EXAMPLE 1 (IE1) AND NON-INVENTION EXAMPLE 1 (NIE1)

Two raw mixes were prepared with the following compositions:

For Invention Example 1:
  $BaF_2$: 0.819 mol
  $SrF_2$: 0.18 mol
  $PbF_2$: 0.0001 mol
  $NH_4Br$: 0.82 mol
  $NH_4I$: 0.15 mol
  $EuF_3$: 0.001 mol
  CsI: 0.003 mol.

Non-Invention example 1:
  $BaF_2$: 0.819 mol
  $SrF_2$: 0.18 mol
  $NH_4Br$: 0.82 mol
  $NH_4I$: 0.15 mol
  $EuF_3$: 0.001 mol
  CsI: 0.003 mol.

After the preparation procedure described above, two phosphor samples were obtained, and the composition of each was determined according to measurement A. The Non-Invention phosphor corresponded to the formula:

$$Ba_{0.8175}Sr_{0.18}Eu_{0.001}Cs_{0.0015}F_{1.19}Br_{0.70}I_{0.11} \quad (NIE1)$$

The Invention phosphor corresponded to the formula $$Ba_{0.8174}Sr_{0.18}Eu_{0.001}Pb_{0.0001}Cs_{0.0015}F_{1.12}Br_{0.77}I_{0.11} \quad (IE1)$$

Both powders were dispersed in a binder solution containing cellulose acetobutyrate dissolved in methyl ethyl ketone. The dispersions obtained were coated onto a 100μ thick transparent sheet of polyethylene terephtalate to give a dry coating weight of about 1,000 g/m².

The conversion efficiency (C.E.) and stimulation energy (S.E.) were measured according to measurement B under stimulation with a GaAlAs laser emitting at 835 nm. If the sensitivity (F.O.M.) of the Non-Invention phosphor (NIE1) set is arbitrarily at 100, the Invention Example 1 phosphor (IE1) has a sensitivity of 126.

INVENTION EXAMPLE 2 (IE2) AND 3 (IE3) AND NON-INVENTION EXAMPLE 2 (NIE2)

Three raw mixes were prepared with the following compositions:

For Non-Invention Example 2:
- $BaF_2$: 0.859 mol
- $SrF_2$: 0.14 mol
- $NH_4Br$: 0.994 mol
- $NH_4I$: 0.186 mol
- $EuF_3$: 0.001 mol
- $CsI$: 0.003 mol.

Invention Example 2:
- $BaF_2$: 0.859 mol
- $SrF_2$: 0.14 mol
- $PbF_2$: 0.0003 mol
- $NH_4Br$: 0.994 mol
- $NH_4I$: 0.0.186 mol
- $EuF_3$: 0.001 mol
- $CsI$: 0.003 mol.

Invention Example 3:
- $BaF_2$: 0.829 mol
- $SrF_2$: 0.14 mol
- $CaF_2$: 0.03 mol
- $PbF_2$: 0.0003 mol
- $NH_4Br$: 0.994 mol
- $NH_4I$: 0.186 mol
- $EuF_3$: 0.001 mol
- $CsI$: 0.003 mol.

The synthesis was performed in the above described way. The compositions of the obtained phosphors were determined in the way described hereinbefore (Measurement A). The resulting phosphors had the following compositions:

Non-Invention Example 2:

$$Ba_{0.8585}Sr_{0.14}Eu_{0.001}Cs_{0.0015}F_{1.03}Br_{0.87}I_{0.10}$$

Invention Example 2:

$$Ba_{0.8582}Sr_{0.14}Pb_{0.0003}Eu_{0.001}Cs_{0.0015}F_{1.03}Br_{0.86}I_{0.11}$$

Invention Example 3:

$$Ba_{0.8272}Sr_{0.14}Ca_{0.03}Pb_{0.0003}Eu_{0.001}Cs_{0.0015}F_{1.06}Br_{0.84}I_{0.10}$$

The powders were dispersed in a binder solution containing cellulose acetobutyrate dissolved in methyl ethyl ketone. The dispersions obtained were coated onto a 100 μ thick transparent sheet of polyethylene terephtalate to give a dry coating weight of about 1,000 g/m².

The conversion efficiency (C.E.) and stimulation energy (S.E.) were measured under stimulation with a GaAlAs laser emitting at 835 nm (Measurement B).

If the sensitivity (F.O.M.) of the Non-Invention 2 phosphor is arbitrarily set at 100, the Invention Example 2 phosphor has a sensitivity of 112, and the Invention Example 3 phosphor has a sensitivity of 193.

From the stimulation spectra, measured according to measurement C, the relative stimulability of the Invention phosphor 3 (IE3) with respect to the stimulability of the Non-Invention phorphor 2 (NIE2) were calculated at wavelengths 700 nm, 750 nm, 800 nm and 850 nm. The results are to be found in table 2.

TABLE 2

| Wavelength in nm | Relative stimulated energy for NIE2 phosphor | Relative stimulated energy for IE3 phosphor |
|---|---|---|
| 700 | 100 | 128 |
| 750 | 100 | 187 |
| 800 | 100 | 226 |
| 850 | 100 | 236 |

We claim:

1. A radiation image recording and reproducing method comprising the steps of:
   i. causing a radiation image storage panel containing a photostimulable phosphor to absorb radiation having passed through an object or having been radiated from an object,
   ii. exposing said image storage panel to stimulating rays to release the radiation energy stored therein as light emission, the stimulating rays being electromagnetic waves having a wavelength within the range o f 700–900 nm
   iii. detecting the emitted light,
   characterised in that said photostimulable phosphor corresponds to the general formula:

$$Ba_{1-x-y''-z-r}Sr_xPb_{y''}Cs_zEu_zF_{2-a-b}Br_aI_b,$$

wherein
$0 \leq x \leq 0.30$, $10^{-4} < y'' < 10^{-3}$, $10^{-7} < z < 0.15$, $0 \leq r < 0.05$, $0.75 \leq a+b \leq 1.00$, $0.05 < b < 0.20$.

2. A radiation image recording and reproducing method according to claim 1, wherein said photostimulable phosphor corresponds to the general formula:

$$Ba_{1-x-y-z-r}Sr_xCa_yPb_{y''}Cs_zEu_zF_{2-a-b}Br_aI_b,$$

wherein
$0 \leq x \leq 0.30$, $0.01 < y < 0.15$, $10^{-4} < y'' < 10^{-3}$, $y = y' + y'' 10^{-7} < z < 0.15$, $0 \leq r < 0.05$, $0.75 \leq a+b \leq 1.00$, $0.05 < b < 0.20$.

3. A radiation image recording and reproducing method according to claim 1, wherein said photostimulable phosphor corresponds to the general formula:

$$Ba_{1-x-y''-z-r}Sr_xPb_{y''}Cs_zEu_zF_{2-a-b}Br_aI_b,$$

wherein
$0 < x \leq 0.30$, $10^{-4} < y'' < 10^{-3}$, $10^{-7} < z < 0.15$, $0 \leq r < 0.05$, $0.75 \leq a+b \leq 1.00$, $0.05 < b < 0.20$.

4. A radiation image recording and reproducing method according to claim 1, wherein said photostimulable phosphor corresponds to the general formula:

$$Ba_{1-x-y-z-r}Sr_xCa_yPb_{y''}Cs_{2r}Eu_zF_{2-a-b}Br_aI_b,$$

wherein $0<x\leq 0.30$, $001<y<0.15$, $10^{-4}<y''<10^{-3}$, $y=y'+y''$ $10^{-7}<z<0.15$, $0\leq r<0.05$, $0.75\leq a+b\leq 1.00$, $0.05<b<0.20$.

5. A radiation image recording and reproducing method according to claim 1, wherein said photostimulable phosphor has a size distribution of the phosphor particles that comprises at most 20% by weight of particles with a diameter smaller than 1 μm.

6. A radiation image recording and reproducing method according to claim 1, wherein said photostimulable phosphor has a size distribution of the phosphor particles that comprises at most 10% by weight of particles with a diameter smaller than 1 μm.

7. A radiation image recording and reproducing method according to claim 1, wherein said stimulating rays are electromagnetic waves having a wavelength within the range of 750–850 nm.

8. A radiation image recording and reproducing method according to claim 1, wherein said stimulating rays are produced by a solid state GaAlAs laser.

9. A radiation image recording and reproducing method according to claim 2, wherein said photostimulable phosphor has a size distribution of the phosphor particles that comprises at most 20% by weight of particles with a diameter smaller than 1 μm.

10. A radiation image recording and reproducing method according to claim 2, wherein said photostimulable phosphor has a size distribution of the phosphor particles that comprises at most 10% by weight of particles with a diameter smaller than 1 μm.

11. A radiation image recording and reproducing method according to claim 2, wherein said stimulating rays are electromagnetic waves having a wavelength within the range of 750–850 nm.

12. A radiation image recording and reproducing method according to claim 2, wherein said stimulating rays are produced by a solid state GaAlAs laser.

13. A radiation image recording and reproducing method according to claim 3, wherein said photostimulable phosphor has a size distribution of the phosphor particles that comprises at most 20% by weight of particles with a diameter smaller than 1 μm.

14. A radiation image recording and reproducing method according to claim 3, wherein said photostimulable phosphor has a size distribution of the phosphor particles that comprises at most 10% by weight of particles with a diameter smaller than 1 μm.

15. A radiation image recording and reproducing method according to claim 3, wherein said stimulating rays are electromagnetic waves having a wavelength within the range of 750–850 nm.

16. A radiation image recording and reproducing method according to claim 3, wherein said stimulating rays are produced by a solid state GaAlAs laser.

17. A radiation image recording and reproducing method according to claim 4, wherein said photostimulable phosphor has a size distribution of the phosphor particles that comprises at most 20% by weight of particles with a diameter smaller than 1 μm.

18. A radiation image recording and reproducing method according to claim 4, wherein said photostimulable phosphor has a size distribution of the phosphor particles that comprises at most 10% by weight of particles with a diameter smaller than 1 μm.

19. A radiation image recording and reproducing method according to claim 4, wherein said stimulating rays are electromagnetic waves having a wavelength within the range of 750–850 nm.

20. A radiation image recording and reproducing method according to claim 4, wherein said stimulating rays are produced by a solid state GaAlAs laser.

* * * * *